(12) United States Patent
Ge et al.

(10) Patent No.: US 12,124,758 B2
(45) Date of Patent: Oct. 22, 2024

(54) MULTI-HOST SYSTEM AND OPERATION SHARING METHOD

(71) Applicant: GENESYS LOGIC, INC., New Taipei (TW)

(72) Inventors: Huan-Sen Ge, New Taipei (TW); Chih-Wei Wen, New Taipei (TW); Feng-Chang Lo, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 18/544,470

(22) Filed: Dec. 19, 2023

(65) Prior Publication Data

US 2024/0264788 A1    Aug. 8, 2024

Related U.S. Application Data

(60) Provisional application No. 63/443,455, filed on Feb. 6, 2023.

(30) Foreign Application Priority Data

Aug. 2, 2023   (TW) .................. 112129051

(51) Int. Cl.
  *G06F 3/14* (2006.01)
  *G06F 21/84* (2013.01)
(52) U.S. Cl.
  CPC .......... *G06F 3/1423* (2013.01); *G06F 3/1462* (2013.01); *G06F 21/84* (2013.01)
(58) Field of Classification Search
  CPC ...... G06F 3/1423; G06F 3/1462; G06F 21/84; G06F 3/1454
  See application file for complete search history.

(56) References Cited

U.S. PATENT DOCUMENTS

| | | | |
|---|---|---|---|
| 9,116,652 B2* | 8/2015 | Yun | G06F 3/0486 |
| 10,055,105 B2 | 8/2018 | Holmes et al. | |
| 10,529,303 B2* | 1/2020 | Li | G06V 20/59 |
| 10,635,378 B2 | 4/2020 | Kumar et al. | |
| 10,819,768 B2 | 10/2020 | Laukkanen et al. | |
| 11,275,547 B2* | 3/2022 | Torii | G06F 3/016 |
| 2014/0168277 A1* | 6/2014 | Ashley | G06F 3/1446 |
| | | | 345/672 |
| 2018/0143932 A1 | 5/2018 | Lawless et al. | |
| 2020/0312279 A1* | 10/2020 | Sage | G09G 3/32 |
| 2022/0326967 A1* | 10/2022 | Khan | G06F 3/1423 |

OTHER PUBLICATIONS

"Office Action of Taiwan Counterpart Application", issued on Jun. 27, 2024, p. 1-p. 4.

* cited by examiner

*Primary Examiner* — Andrew Sasinowski
(74) *Attorney, Agent, or Firm* — JCIPRNET

(57) ABSTRACT

A multi-host system and an operation sharing method are provided. In the method, whether operating information of a human-machine interface device being conformed with a switching condition is determined through a first software. When the operating information is conformed with the switching condition, operating the screen displayed by the second display according to the operating information of the human-machine interface device through a first host device or a second host device. Accordingly, interaction convenience and flexibility between multiple host devices are improved.

23 Claims, 14 Drawing Sheets

MULTI-HOST SYSTEM AND OPERATION SHARING METHOD

This application claims the priority benefit of U.S. provisional application Ser. No. 63/443,455, filed on Feb. 6, 2023, and Taiwan application serial no. 112129051, filed on Aug. 2, 2023. The entirety of each of the above-mentioned patent applications is hereby incorporated by reference herein and made a part of this specification.

BACKGROUND

Technical Field

The disclosure relates to multi-host control, and particularly relates to a multi-host system and an operation sharing method.

Description of Related Art

In some application situations, a human-machine interface device connected to a computer may need to be shared with another computer. The human-machine interface device may also be referred to as a human interface device (HID, such as a mouse and/or a keyboard). For example, a mouse connected to a first computer may be used to control a cursor of a second computer.

SUMMARY

Embodiments of the disclosure are directed to a multi-host system and an operation sharing method, which are adapted to share images and/or operations of a human-machine interface device among a plurality of computers according to requirements.

An embodiment of the disclosure provides an operation sharing method adapted to operations between a first host device and a second host device. The first host device is coupled to a human-machine interface device and a first display, first software is loaded on the first host device, the second host device is coupled to a second display, second software is loaded on the second host device, and the first host device is communicatively connected to the second host device. The operation sharing method includes (but is not limited to) the following steps: whether operating information of the human-machine interface device is conformed with a first switching condition is determined through the first software. When the operating information is conformed with the first switching condition, a screen displayed on the second display is operated through the first host device or the second host device according to the operating information of the human-machine interface device. The step of determining whether the operating information is conformed with the first switching condition includes: comparing the operating information of the human-machine interface device with a first switching boundary on the first screen through the first software, and generating a first comparison result. The screen displayed on the second display for operation is determined according to the first comparison result.

An embodiment of the disclosure provides a multi-host system includes (but not limited to) a first display, a human-machine interface device, a first host device, a second display, and a second host device. The first host device determines whether operating information of the human-machine interface device is conformed with a first switching condition. When the operating information is conformed with the first switching condition, the first host device or the second host device operates a screen displayed on the second display according to the operating information of the human-machine interface device. The first host device compares the operating information of the human-machine interface device with a first switching boundary on the first screen, and generates a first comparison result. The first host device or the second host device operates the screen displayed on the second display according to the first comparison result.

An embodiment of the disclosure provides a multi-host system includes (but not limited to) a first display, a human-machine interface device, a first host device, a second display, a second host device, and a bridge device. The first display is configured to display a first screen. The first host device is coupled to the first display and the human-machine interface device. The second host device is coupled to the second display. The bridge device is communicatively connected between the first host device and the second host device. The bridge device transfers another screen from the first host device and operating information of the human-machine interface device, the second host device displays the another screen through the second display, and the second host device operates the screen displayed on the second display according to the operating information of the human-machine interface device.

Based on the above description, according to the multi-host system and the operation sharing method of the embodiment of the disclosure, when the switching condition is met, the screen and operation may be shared, thereby improving the convenience of operation.

To make the aforementioned more comprehensible, several embodiments accompanied with drawings are described in detail as follows.

DESCRIPTION OF THE EMBODIMENTS

Figure 1:
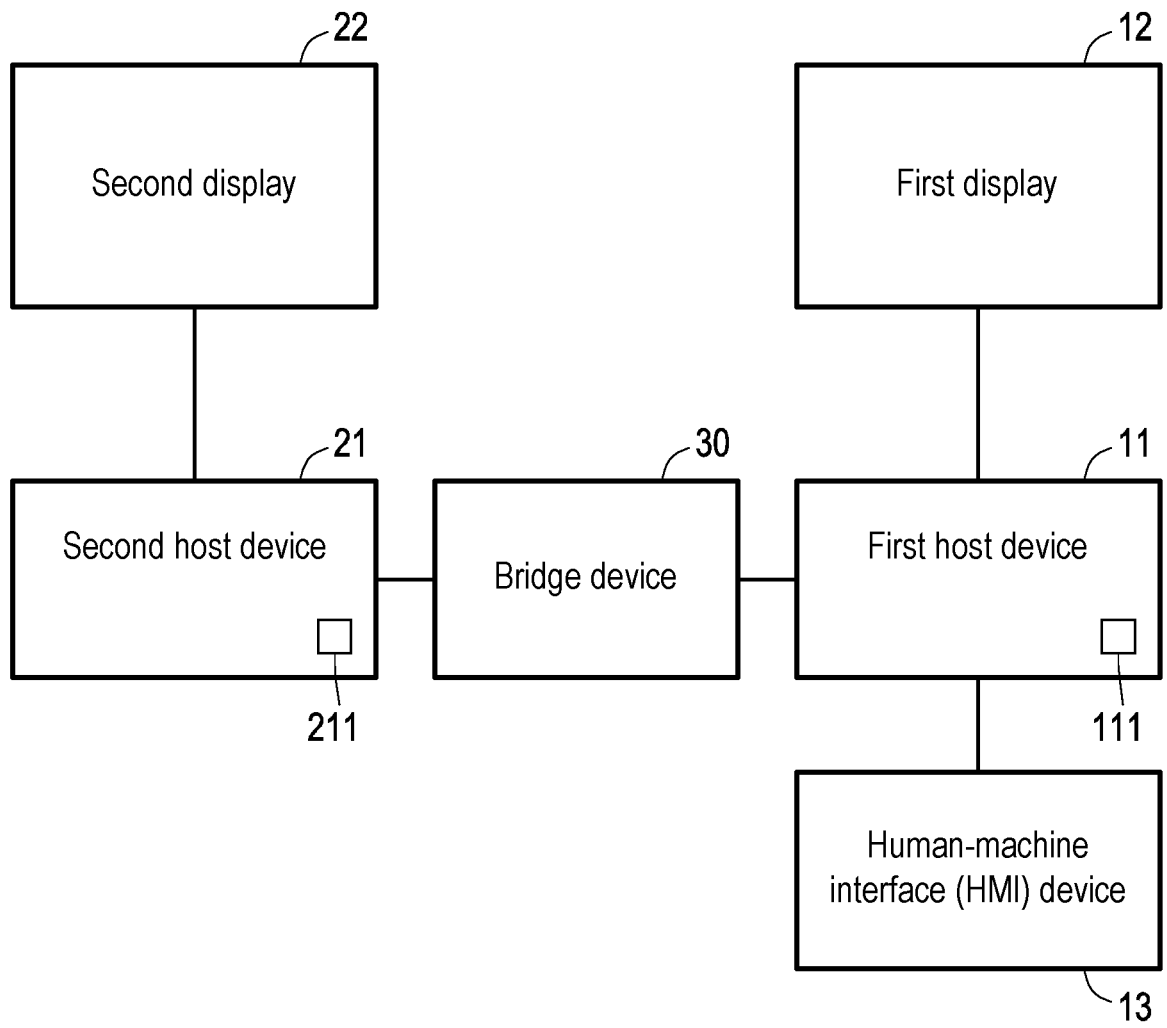
FIG. 1 is a component block diagram of a multi-host system according to an embodiment of the disclosure.

FIG. 1 is a component block diagram of a multi-host system 1 according to an embodiment of the disclosure. Referring to FIG. 1, the multi-host system 1 includes (but not limited to) a first host device 11, a first display 12, one or a plurality of human-machine interface (HMI) devices 13, a second host device 21, a second display 22 and a bridge device 30.

The first host device 11 may be a personal computer, a workstation, a tablet computer, an intelligent assistant device or other computing devices. In an embodiment, the first host device 11 is loaded with first software 111, and functions of the first software 111 will be described in detail in the following embodiments.

The first display 12 is coupled to the first host device 11. The first display 12 may be a liquid crystal display (LCD), a light-emitting diode (LED) display or an organic light-emitting diode (OLED) display. In an embodiment, the first display 12 is configured to display a screen. For example, an output image of a display card of the first host device 11.

The HMI device 13 is coupled to the first host device 11. The HMI device 13 may be a human interface device (HID), such as a keyboard, a mouse, and/or other HMI devices. In an embodiment, the HMI device 13 is configured to receive an operation of a user. For example, a button press operation or a mouse moving operation.

In some embodiments, the HMI device 13 generates a HMI device report (for example, a HID report or an interrupt event) based on the operation received from the user. The first host device 11 may obtain operating information (for example, a moving vector of a mouse, or one of a plurality of keys that is pressed) corresponding to the operation of the HMI device 13 from the HMI device report of the HMI device 13.

In an embodiment, the HMI device 13 may be coupled to the first host device 11 through a universal serial bus (USB) or other connection interfaces. In some exemplary embodiments, the HMI device report of the HMI device 13 may be HID interrupt data conforming to the USB specification. The HMI device report of the HMI device 13 may be defined in an HID descriptor presented by the HMI device 13 to the first host device 11.

The second host device 21 may be a personal computer, a workstation, a tablet computer, an intelligent assistant device or other computing devices. In an embodiment, the second host device 21 is loaded with second software 211, and functions of the second software 211 will be described in detail in the following embodiments.

The second display 22 is coupled to the second host device 21. The second display 22 may be an LCD, ab LED display or an OLED display. In an embodiment, the second display 22 is configured to display a screen. For example, an output image of a display card of the second host device 21.

The bridge device 30 is communicatively connected between the first host device 11 and the second host device 21. In an embodiment, the bridge device 30 establishes a communication channel between the first host device 11 and the second host device 21, so that the first host device 11 is communicatively connected with the second host device 21. In an embodiment, the communication channel 130 may include a USB cable, an Ethernet network (Ethernet), a wireless local area network and (or) other communication networks.

In an embodiment, the bridge device 30 may be a USB device. In some embodiments, the bridge device 30 may be a USB hub. In some other embodiments, the bridge device 30 may be other relay devices for wireless or wired transmission.

In other embodiments, the relay device between the first host device 11 and the second host device 21 is not limited to the bridge device 30 (or there may be no relay device), or the communication channel is not limited to the channel established by the bridge device 30.

It should be noted that the multi-host system 1 may further include more host devices, and the number of the host devices is not limited to the embodiment shown in FIG. 1.

Hereinafter, the method of the embodiment of the disclosure will be described with reference of each device and/or component in the multi-host system 1. Each process of the method in the embodiment of the disclosure may be adjusted according to an actual implementation situation, and is not limited thereto.

Figure 2:
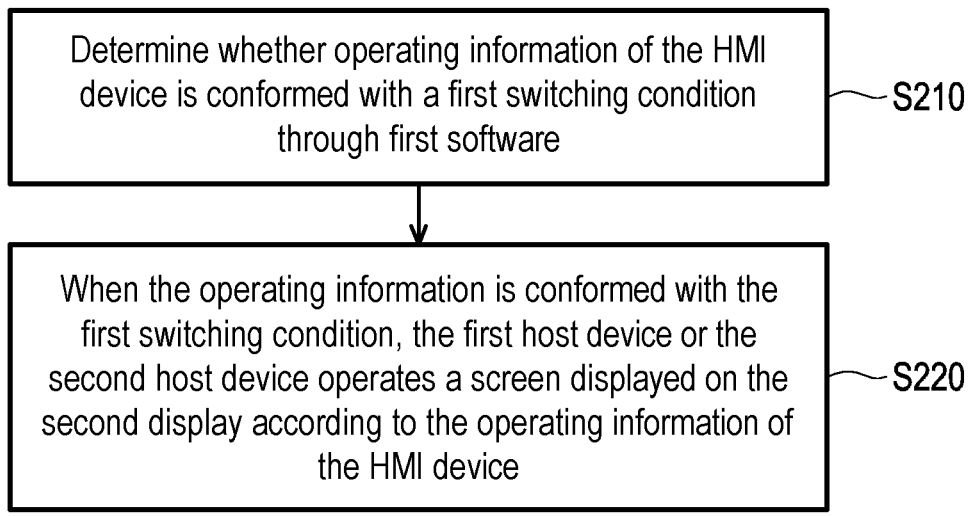
FIG. 2 is a flowchart of an operation sharing method according to an embodiment of the disclosure.

FIG. 2 is a flowchart of an operation sharing method according to an embodiment of the disclosure. Referring to FIG. 2, the first host device 11 determines whether operating information of the HMI device 13 is conformed with a first switching condition through the first software 111 (step S210). Specifically, the first switching condition is related to the operating information of the HMI device corresponding to a first interactive position on a first screen displayed on the first display 12. The HMI device 13 is, for example, a mouse, a trackball, a touchpad or a gesture recognition sensor (but the disclosure is not limited thereto). The HMI device 13 may detect a position, a moving amount and a moving direction (the moving amount and moving direction are collectively referred to as a moving vector hereinafter) of a hand or other operating parts of the user, and generate a HMI device report accordingly. The first host device 11 may obtain the operating information of the HMI device 13 from the HMI device report of the HMI device 13. The operating information is, for example, a position and/or moving vector of a mouse, a trackball, a touch point or a gesture. The first host device 11 may map/convert the position in the operating information of the HMI device 13 to the first screen displayed on the first display 12, so as to generate the first interactive position corresponding to the operating information of the HMI device 13. The first interactive position on the first screen may be changed along with a change of the position and/or the moving vector in the operating information.

In an embodiment, the first host device 11 may further display a cursor at the first interactive position in the first screen through the first display 12.

In addition, the first host device 11 may compare the operating information of the HMI device 13 with a first switching boundary on the first screen through the first software 111, and generate a first comparison result. In an embodiment, the first comparison result is that the operating information of the HMI device 13 corresponds to the first interactive position on the first screen displayed on the first display 12. The first software 111 may determine whether the first interactive position exceeds the first switching boundary defined by the first switching condition. The first comparison result is that the first interactive position corresponding to the operating information exceeds the first switching boundary or the first interactive position does not exceed the first switching boundary.

In an embodiment, when the first comparison result is that the first interactive position corresponding to the operating information of the HMI device 13 exceeds the first switching boundary on the first screen, the first host device 11 may determine that the operating information of the HMI device 13 is conformed with the first switching condition through the first software 111. In an embodiment, the first switching boundary is, for example, a left/right/upper/lower boundary of the first screen displayed on the first display 12. For example, the side boundaries are those pixels having minimum/maximum coordinate values on a vertical axis or those pixels having the minimum/maximum coordinate values on a horizontal axis among pixel coordinates of the first screen. In another embodiment, the first switching boundary may also be other positions, line segments or areas in the first screen, which may be predefined or adjusted afterwards.

The first software 111 may compare pixel coordinates of the first interactive position and the first switching boundary to determine whether the first interactive position exceeds the first switching boundary on the first screen. For example, the first switching boundary is those pixels having the smallest coordinate values on the vertical axis in the pixel coordinates. If the pixel coordinates of the first interactive position are smaller than the coordinates of the first switching boundary in the vertical direction, the first software 111 may determine that the first interactive position exceeds the first switching boundary.

In some embodiments, the first switching condition may also be a moving track, a stay time or other factors related to the first interactive position.

Referring to FIG. 2 again, after the first software 111 determines whether the operating information of the HMI device 13 is conformed with the first switching condition (step S210), when the operating information of the HMI device 13 is conformed with the first switching condition, the first host device 11 or the second host device 21 operates a screen displayed on the second display 22 according to the operating information of the HMI device 13 (step S220). Specifically, the first host device 11 may use the first software 111 or the second host device 21 may use the second software 211 to decide to operate the screen displayed on the second display 22 according to the first comparison result. In an embodiment, when the first comparison result is that the first interactive position exceeds the first switching boundary, the first software 111 or the second software 211 allows to use the operating information of the HMI device 13 coupled with the first host device 11 to operate the screen displayed on the second display 22. In another embodiment, when the first comparison result is that the first interactive position does not exceed the first switching boundary, the first software 111 or the second software 211 prohibits to/does not use the operating information of the HMI device 13 coupled with the first host device 11 to operate the screen displayed on the second display 22.

The first host device 11 is not directly connected to the second display 22, and the HMI device 13 is not directly connected to the second host device 21. In an embodiment, the bridge device 30 supports a network control module (NCM) to form an Ethernet network. The first host device 11, the second host device 21 or other host devices connected to the bridge device 30 may establish a local/private network. Then, these host devices may share/transmit the screen and/or the operating information of the HMI device 13 to other host devices, and the multiple host devices may share the screen and/or the operating information. However, the connection between multiple host devices is not limited to the network control module provided by the bridge device 30, which may also be based on other communication protocols or transmission interfaces in other embodiments.

Embodiments of the disclosure provide multiple sharing modes to share the screen and/or the operating information according to actual needs.

Figure 3:
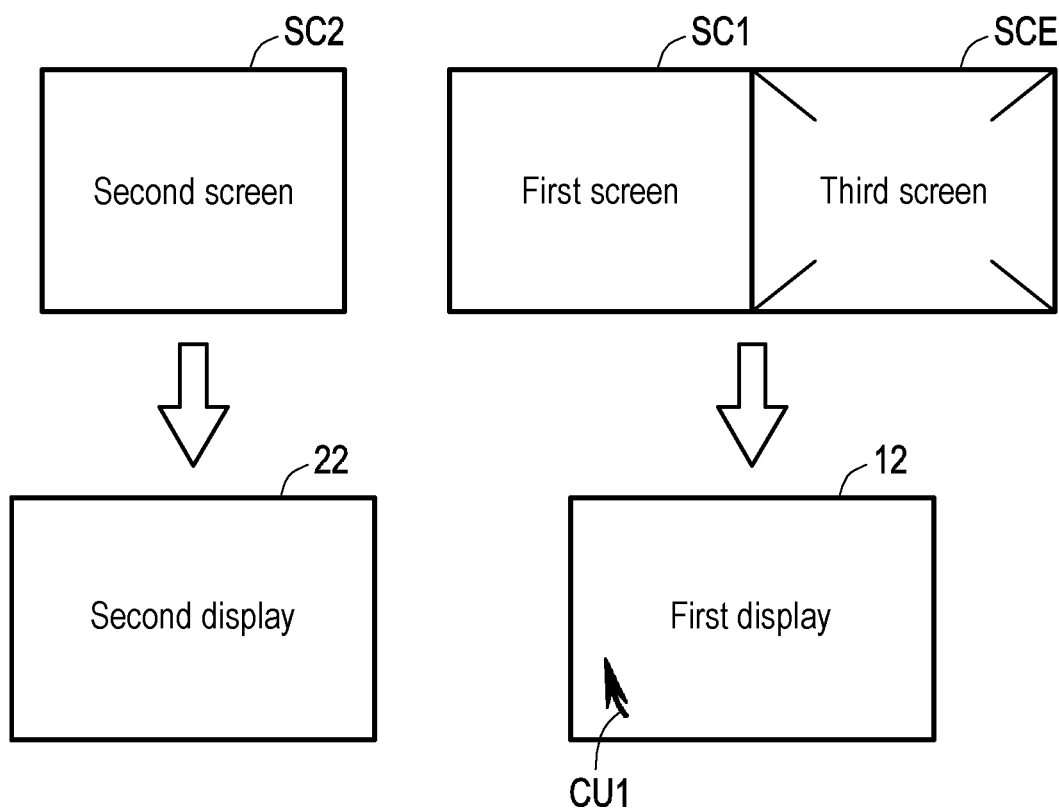
FIG. 3 is a schematic diagram of a system configuration according to an embodiment of the disclosure.

Screen Sharing Mode:

FIG. 3 is a schematic diagram of a system configuration according to an embodiment of the disclosure. Referring to FIG. 1 and FIG. 3, the first display 12 is an output monitor of the first host device 11, and a first screen SC1 (the first screen SC1 comes from the first host device 11, for example, the first screen SC1 is output through a display card of the first host device 11) is the content displayed on the first display 12. The second display 22 is an output monitor of the second host device 21, and a second screen SC2 (the second screen SC2 comes from the second host device 21, for example, the second screen SC2 is output through a display card of the second host device 21) is the content displayed on the second display 22. In addition, a third screen SCE is an extended screen extended from the first screen SC1 (for example, output through a display card of the first host device 11), and may be realized through a virtual display device. In an embodiment, before the first software 111 is executed, the first host device 11 may disable/stop the virtual display device. On the other hand, the first host device 11 may generate a cursor CU1 based on the operating information of the connected HMI device 13.

Figure 4A:
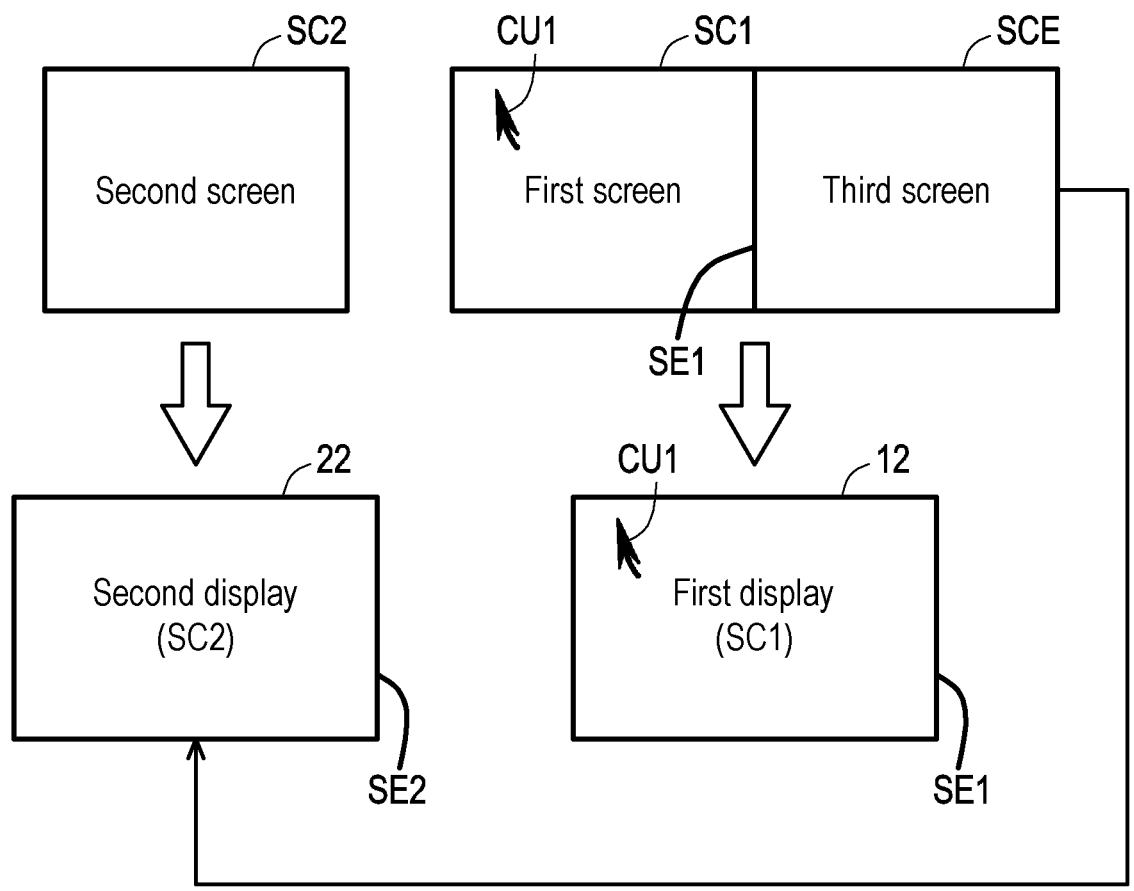
FIG. 4A and FIG. 4B are schematic diagrams illustrating a screen sharing mode according to an embodiment of the disclosure.
Figure 4B:
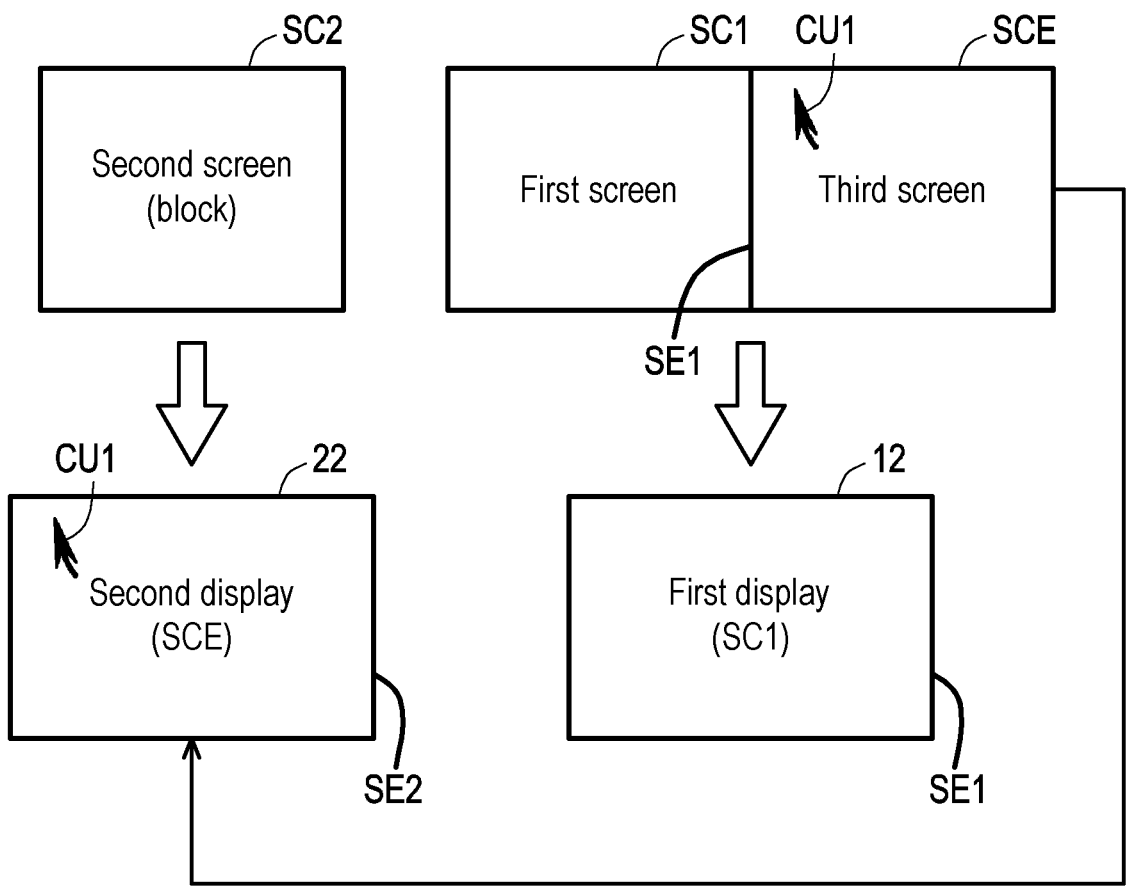
Figure 4C:
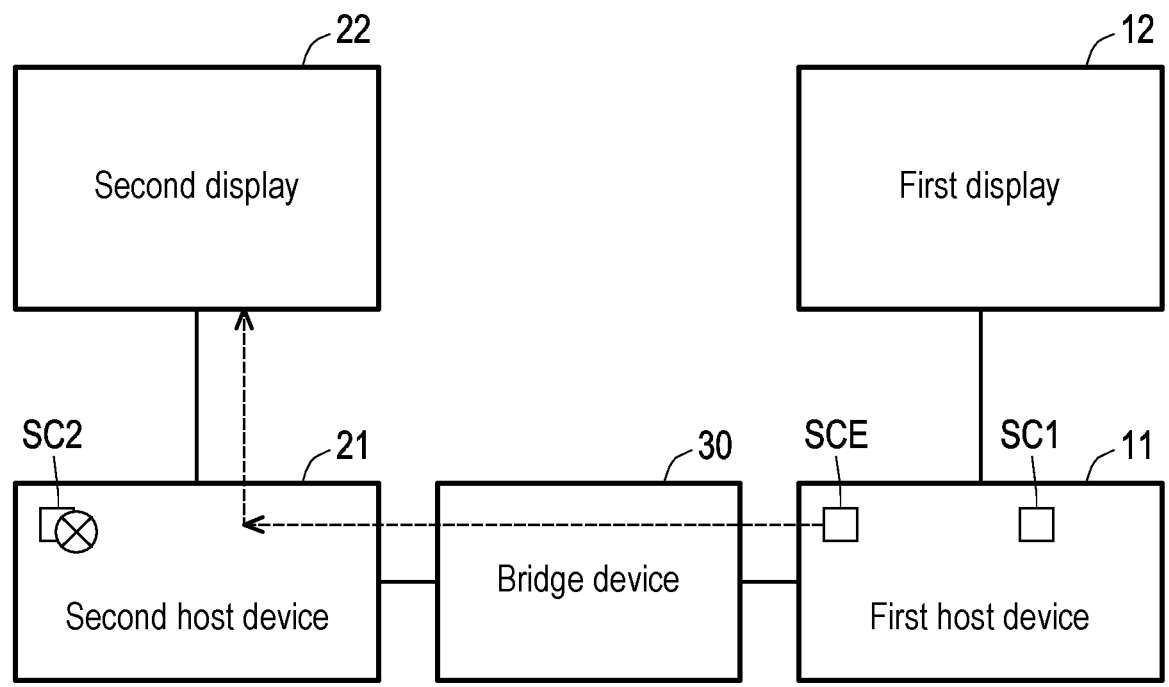
FIG. 4C is a schematic diagram illustrating screen sharing according to an embodiment of the disclosure.

Application Scenario 1—To Only Share the Screen:

FIG. 4A and FIG. 4B are schematic diagrams illustrating a screen sharing mode according to an embodiment of the disclosure, and FIG. 4C is a schematic diagram illustrating screen sharing according to an embodiment of the disclosure. Referring to FIG. 1 and FIG. 4A to FIG. 4C, the second display 22 may be used as an extended monitor of the first host device 11. The first host device 11 may define that the third screen SCE is located on a right side of the first screen SC1 (but the disclosure is not limited to this position, which may be changed in other situations, such as located on a left side of the first screen SC1). The first host device 11 may transmit the third screen SCE extended from the first screen SC1, the bridge device 30 forwards the third screen SCE, and the second host device 21 receives the third screen SCE from the first host device 11. The second host device 21 may display the received third screen SCE through the second display 22.

When the cursor CU1 is located on the first screen SC1 as shown in FIG. 4A, the first display 12 displays the cursor CU1. If the cursor CU1 crosses a switching boundary SE1 between the first screen SC1 and the third screen SCE and then reaches a position shown in FIG. 4B, the second display 22 displays the third screen SCE and the cursor CU1.

In an embodiment, the first host device 11 may also use the first software 111 or the second host device 21 may use the second software 211 to determine whether the operating information of the HMI device 13 is conformed with a second switching condition. The second switching condition is related to the operating information of the HMI device 13 corresponding to a second interactive position on the screen displayed on the second display 22. The first host device 11 may map/convert a position in the operating information of the HMI device 13 to the third screen SCE displayed on the second display 22, so as to generate the second interactive position corresponding to the operating information of the HMI device 13. The second interactive position on the screen displayed by the second display 22 may be changed according to a change of the position and/or the moving vector in the operating information. In an embodiment, the first host device 11 may further display the cursor CU1 at the second interactive position on the third screen SCE through the second display 22. The position of the cursor CU1 shown in FIG. 4B is the second interactive position.

In addition, the first host device 11 may use the first software 111 or the second host device 21 may use the second software 211 to compare the operating information of the HMI device 13 with the second switching boundary on the screen displayed by the second display 22 to generate a second comparison result. The second switching boundary may be a left/right/upper/lower side boundary, other positions, lines or areas on the screen displayed by the second display 22. As shown in FIG. 4B, the second switching boundary SE2 is located at the right boundary of the second display 22. Regarding a setting position or form of the second switching boundary SE2, the disclosure does not make any limitation here.

In an embodiment, the second comparison result is that the operating information of the HMI device 13 corresponds to the second interactive position on the screen displayed on the second display 22. The first software 111 or the second software 211 may determine whether the second interactive position exceeds the second switching boundary defined by the second switching condition. The second comparison result is that the second interactive position corresponding to the operating information exceeds the second switching boundary or the second interactive position does not exceed the second switching boundary. When the second interactive position corresponding to the operating information exceeds the second switching boundary on the screen displayed on the second display 22, the first host device 11 may use the first software 111 or the second host device 21 may use the second software 211 to determine that the operating information of the HMI device 13 is conformed with the second switching condition. For example, the cursor CU1 moves from the position shown in FIG. 4B and passes through the second switching boundary SE2, i.e., the second switching condition is met.

In the embodiment shown in FIG. 4A and FIG. 4B, when the cursor CU1 crosses the second switching boundary SE2 from the position shown in FIG. 4B, the cursor CU1 may then reach the position shown in FIG. 4A, as shown in FIG. 4A, the first display 12 may display the cursor CU1 on the first screen SC1.

In an embodiment, when the operating information of the HMI device 13 is conformed with the second switching condition, the first host device 11 or the second host device 21 may operate the screen displayed by the first display 12 according to the operating information of the HMI device 13. Specifically, the first host device 11 may use the first software 111 or the second host device 21 may use the second software 211 to operate the screen displayed on the second display 22 according to the second comparison result. For example, the second comparison result is that the second interactive position exceeds the second switching boundary (for example, the left/right/upper/lower side boundary, other positions, lines or areas) on the third screen SCE. In the disclosure, the second switching boundary may be defined as a shared boundary or an extended boundary. The definition of the second switching boundary will be explained in detail in the following text.

In an embodiment, referring to FIG. 4C, the second host device 21 may block/prohibit display of the second screen SC2 (which may be referred to as an original screen of the second display 22) on the second display 22. For example, the display card of the second host device 21 stops outputting an image signal of the second screen SC2. In addition, the second host device 21 may receive the third screen SCE from the first host device 11. And the second display 22 may display the received third screen SCE.

In another embodiment, the second host device 21 may receive the third screen SCE from the first host device 11. The second host device 21 may (simultaneously) display the second screen SC2 and the third screen SCE. In an embodiment, the second host device 21 may generate a split screen or a picture-in-picture screen on the second display 22, and display the second screen SC2 and the third screen SCE respectively in different image areas of the split screen or the picture-in-picture screen. For example, the larger screen is the second screen SC2, and the smaller screen is the third screen SCE. At this time, the display card of the second host device 21 is adapted to receive the image signals of the third screen SCE and the second screen SC2 and synchronously project them on the second display 22.

Figure 5:
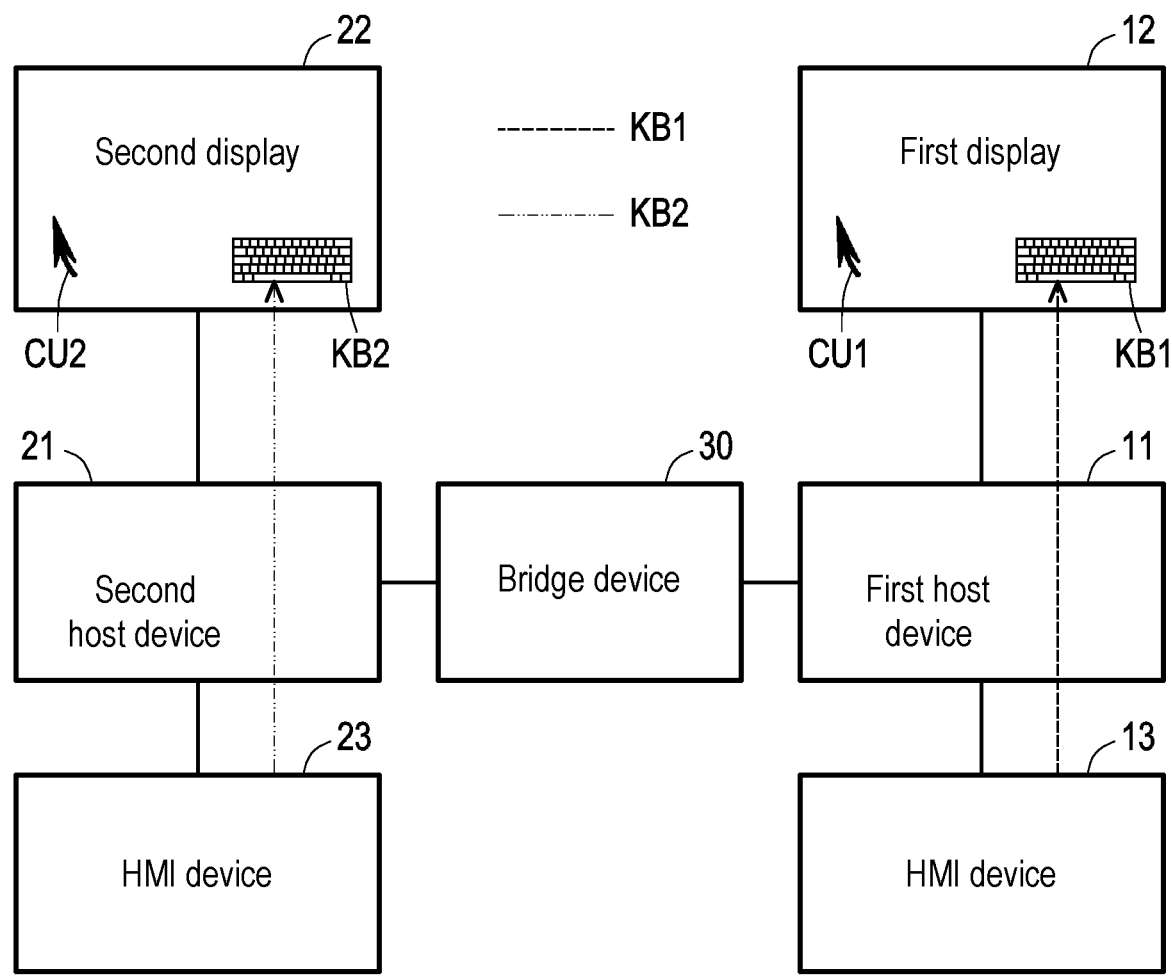
FIG. 5 is a schematic diagram of independent control according to an embodiment of the disclosure.

Operating Information Sharing Mode:
Application scenario 2—Only Share the Operating Information (May Stop Sharing Screen):

FIG. 5 is a schematic diagram of independent control according to an embodiment of the disclosure. Referring to FIG. 5, the multi-host system 1 further includes another or more HMI devices 23. The HMI device 23 is coupled to the second host device 21. For implementation and functions of the HMI device 23, reference may be made to the above-mentioned introduction of the HMI device 13, and detail thereof will not be repeated here. The first host device 11 may control the cursor CU1 displayed on the first display 12 and/or alphanumeric characters or symbols corresponding to specific keys of a keyboard KB1 based on the operating information of the HMI device 13. On the other hand, the second host device 21 may control the cursor CU2 displayed on the second display 22 and/or alphanumeric characters or symbols corresponding to specific keys of a keyboard KB2 based on the operating information of the HMI device 23. Namely, the operation of the coupled host device on the display screen may be independently controlled through the HMI devices 13 and 23.

Figure 6A:
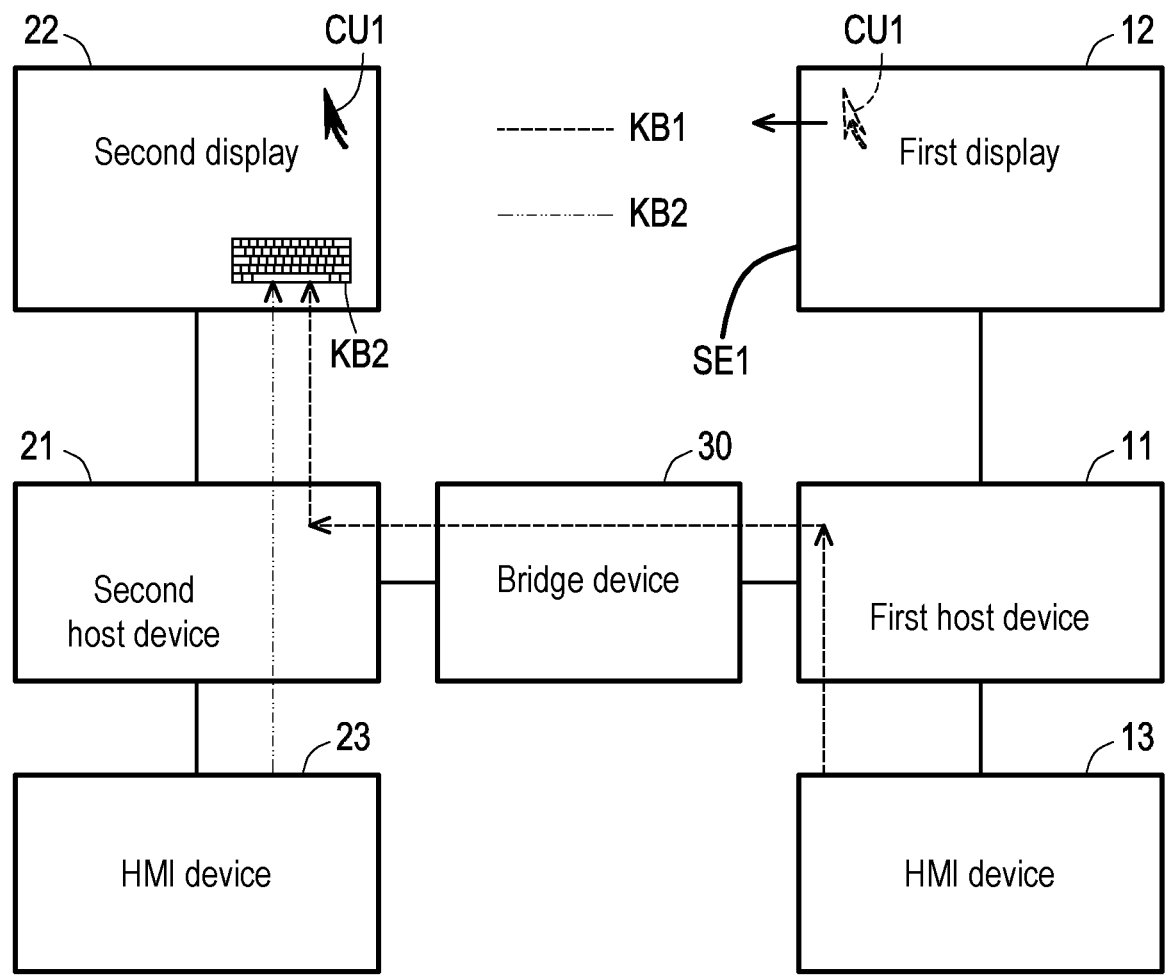
FIG. 6A and FIG. 6B are schematic diagrams illustrating an operation sharing mode according to an embodiment of the disclosure.
Figure 6B:
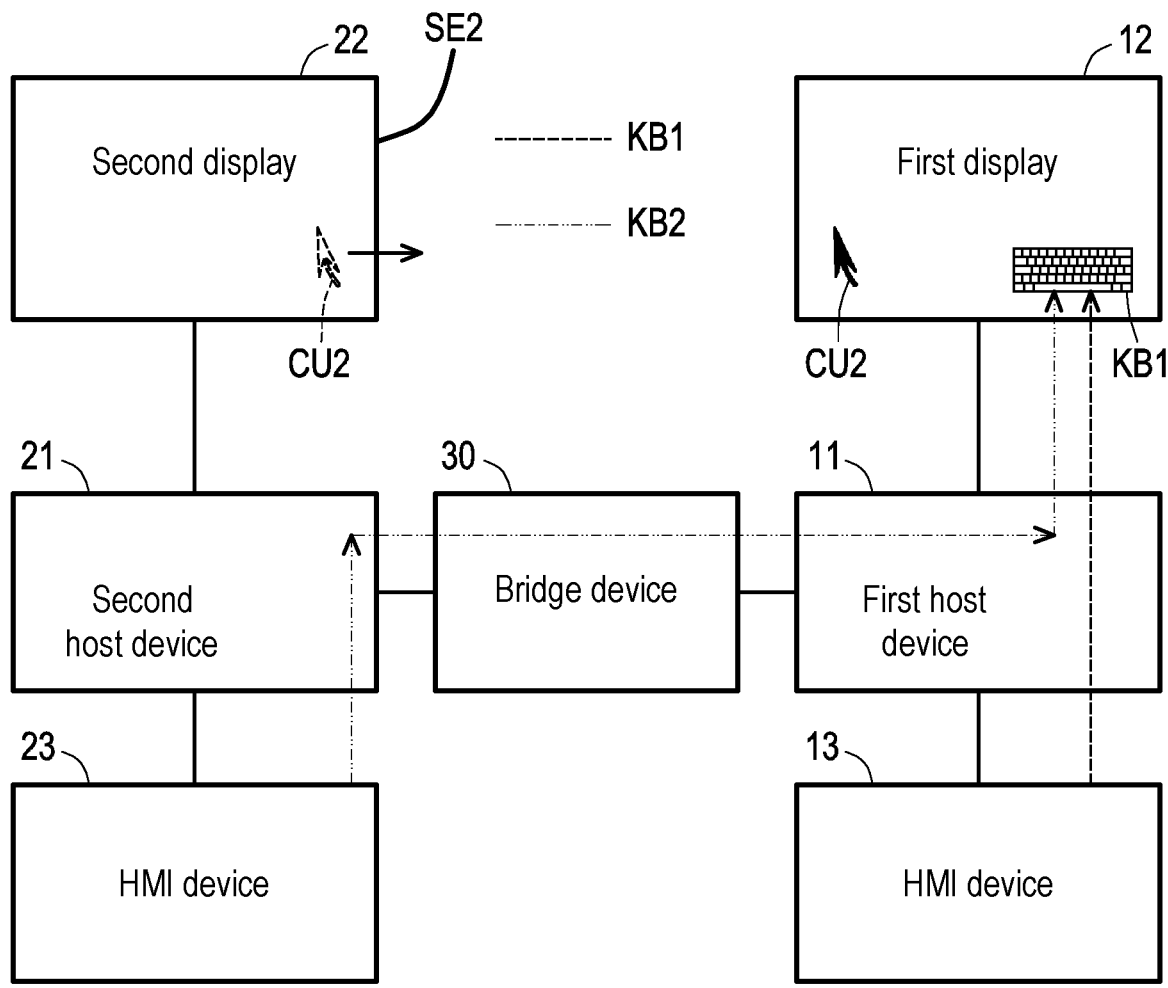

FIG. 6A and FIG. 6B are schematic diagrams illustrating an operation sharing mode according to an embodiment of the disclosure. Referring to FIG. 6A, in an application scenario 2-1, when the position (corresponding to the aforementioned first interactive position) of the cursor CU1 corresponding to the operating information of the HMI device 13 exceeds a switching boundary SE1 of the display screen of the first display 12 (for example, the left boundary is taken as an example, but it may also be other positions, lines or areas), the first host device 11 may prohibit/stop/not display the cursor CU1 on the first display 12. In addition, the first host device 11 may transmit the operating information of the HMI device 13 to the second host device 21 (via the bridge device 30).

In an embodiment, the second software 211 (for example, an application program or a driver program) may convert the operating information of the HMI device 13 from the first host device 11 into an operation event of a mouse/trackball/touchpad/gesture recognition sensor, so as to control the cursor CU2 of the second host device 21. In another embodiment, when the keyboard KB1 receives a user operation, the second software 211 may convert the operating information of the HMI device 13 from the first host device 11 into an operation event of the keyboard KB1, so as to control the second host device 21 through the keyboard KB1. At this time, the keyboard KB1 corresponding to the HMI device 13 and the keyboard KB2 corresponding to the HMI device 23 may simultaneously control the second host device 21.

Referring to FIG. 6B, in an application scenario 2-2, when the position (corresponding to the aforementioned second interactive position) of the cursor CU2 corresponding to the operating information of the HMI device 23 exceeds the second switching boundary SE2 (for example, taking the right boundary as an example, but may also be other positions, lines or areas) of the display screen of the second display 22, the second host device 21 may prohibit/stop/not display the cursor CU2 on the second display 22. In addition, the second host device 21 may transmit the operating information of the HMI device 23 to the first host device 11 (via the bridge device 30). In an embodiment, the first software 111 (for example, an application program or a driver program) may virtualize the operating information of the HMI device 23 from the second host device 21 into an operation event of a mouse/trackball/touchpad/gesture recognition sensor, so as to control the cursor CU2 of the first host device 11. In another embodiment, when the keyboard KB2 receives a user operation, the first software 111 may virtualize the operating information of the HMI device 23 from the second host device 21 into an operation event of the keyboard KB2, so as to control the first host device 11 through the keyboard KB2. At this time, the keyboard KB1 corresponding to the HMI device 13 and the keyboard KB2 corresponding to the HMI device 23 may simultaneously control the first host device 11.

It should be noted that, in the application scenario 2, the application scenario 2-1 and the application scenario 2-2, the second display 22 may still continuously display the second screen from the second host device 21. Namely, the first host device 11 stops/prohibits/does not transmit the third screen SCE or other related screens to the second host device 21. However, in some embodiments, the first host device 11 may still transmit the third screen or other related screens to the second host device 21, and the second host device 21 respectively displays the second screen SC2 and the screen from the first host device in different image areas of the split screen or the picture-in-picture screen on the second display 22.

Screen and Operating Information Sharing Mode:
Application Scenario 3—Simultaneously Share Screen and Operating Information:

In practice, in addition to using the second display 22 of the second host device 21 as an extended screen of the first host device 11, the user may probably wish to operate the content of the second host device 21 itself through movement operations (such as mouse movement, trackball scrolling, touch point movement, or gesture movement) received through the HMI devices 13 and 23.

In an embodiment, when the operating information of the HMI device 13 is conformed with the second switching condition, the first host device 11 or the second host device 21 may operate the screen displayed on the second display 22 according to the operating information of the HMI device 13. Specifically, the first host device 11 may use the first software 111 or the second host device 21 may use the second software 211 to operate the screen displayed on the second display 22 according to the second comparison result. For example, when the second comparison result is that the second interactive position exceeds the second switching boundary (for example, a left/right/upper/lower side boundary, other positions, lines or areas) on the screen displayed on the second display 22, the first host device 11 may use the first software 111 or the second host device 21 may use the second software 211 to operate the screen displayed on the second display 22 according to the second comparison result.

Figure 7:
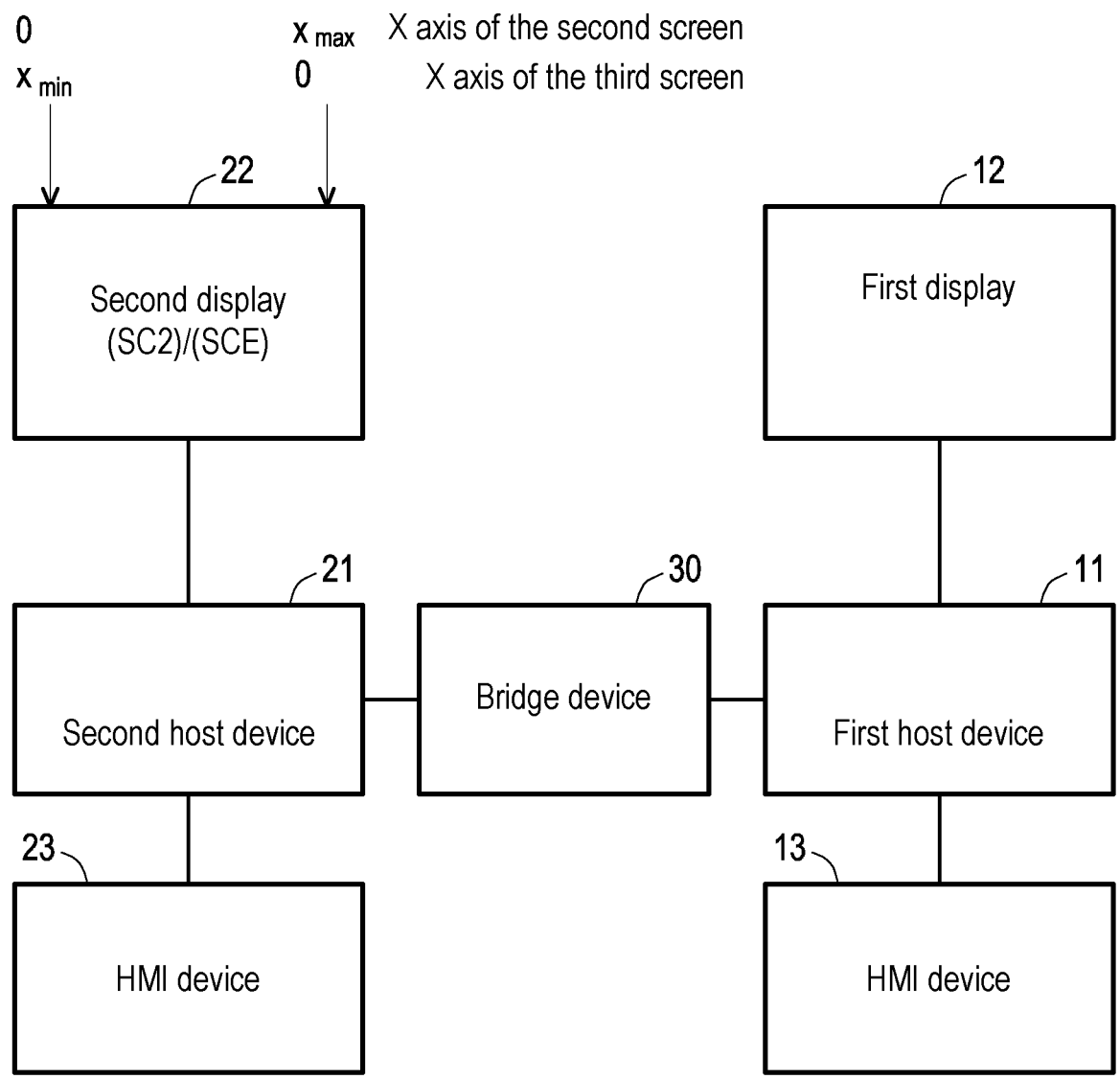
FIG. 7 is a schematic diagram illustrating boundary definition of sharing screen and operation mode according to an embodiment of the disclosure.

FIG. 7 is a schematic diagram illustrating boundary definition of sharing screen and operation mode according to an embodiment of the disclosure. Referring to FIG. 7, in an embodiment, the second switching boundary may be defined as a shared boundary or an extended boundary. When the screen displayed on the second display 22 is the third screen SCE from the first host device 11, the first software 111 or the second software 211 may define the second switching boundary on the third screen SCE displayed on the second display 22 to be the shared boundary (for switching to the second screen SC2). As mentioned above, the second screen SC2 originates from the second host device 21. The second switching condition is related to the second interactive position exceeding the shared boundary. For example, by comparing pixel coordinates of the second interactive position and the shared boundary, it is determined whether the shared boundary is exceeded. The shared boundary may be the left/right/upper/lower boundary, other positions, lines or areas of the screen displayed on the second display 22.

On the other hand, when the screen displayed on the second display is the second screen SC2 from the second host device 21, the first software 111 or the second software 211 may define the second switching boundary on the second screen SC2 displayed on the second display 22 as an extended boundary (for switching to the third screen SCE of the first host device 11). As mentioned above, the third screen SCE is an extended screen originated from the first host device 11. The second switching condition is related to the second interactive position exceeding the extended boundary. For example, by comparing the pixel coordinates of the second interactive position and the shared boundary, it is determined whether the extended boundary is exceeded. The extended boundary may be the left/right/upper/lower side boundary, other positions, lines or areas of the screen displayed on the second display 22.

Referring to FIG. 7, a screen resolution of the second display 22 of the embodiment is $X_{max} \times Y_{max}$. For example, 1920×1080. When the second display 22 is used as an extended screen as shown in FIG. 4B as described in the scenario 1, coordinates of a horizontal axis (for example, an X axis) of the third screen SCE displayed on the second display 22 are ($X_{min}$, 0), i.e., a horizontal axis coordinate is from $X_{min}$ (negative number) to 0. When the second display 22 is still used as a native screen shown in FIG. 4A as described in scenario 2, coordinates of a horizontal axis (for example, X axis) of the second screen SC2 displayed on the second display 22 are (0, $X_{max}$). Namely, the horizontal axis coordinate is from 0 to $X_{max}$. Where, $X_{max}$ is, for example, 1920, and $X_{min}$ is, for example, −1920.

Figure 8:
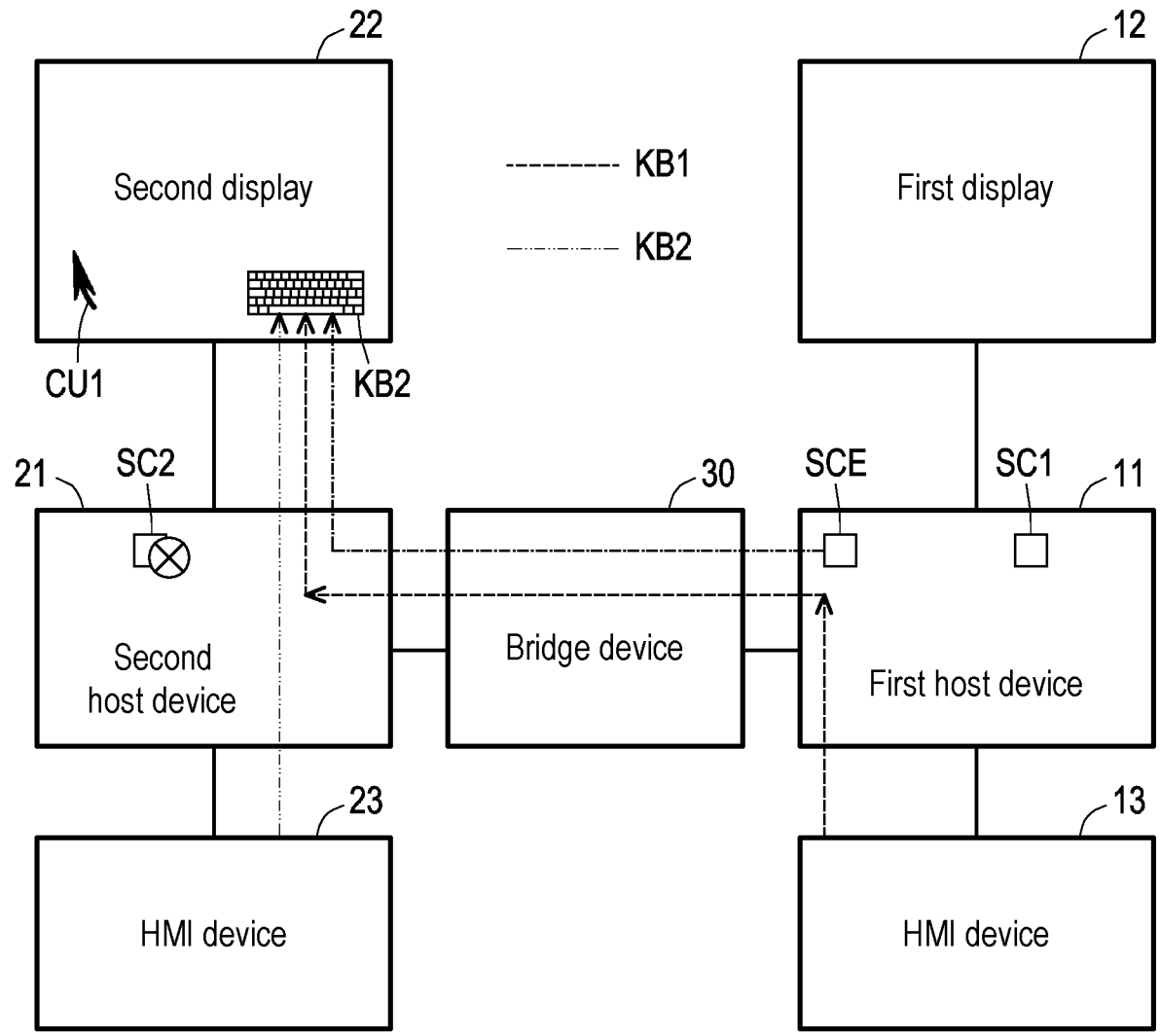
FIG. 8 is a schematic diagram illustrating extended screen application of sharing screen and operation mode according to an embodiment of the disclosure.

FIG. 8 is a schematic diagram illustrating extended screen application of sharing screen and operation mode according to an embodiment of the disclosure. Referring to FIG. 8, in an application scenario 3-1, the second display 22 is used as an extended screen of the first host device 11. At this point, reference may be made to the descriptions of the foregoing application scenario 1 and application scenario 2, and details are not repeated here. For example, the third screen SCE is transmitted to the second host device 21, and the second display 22 may display the extended screen. For another example, the operating information of the HMI device 13 is sent to the second host device 21, so that the cursor CU1 corresponding to the operating information of the HMI device 13 is displayed on the second display 22, or the second display displays characters, numbers or symbols corresponding to specific keys of the keyboard KB1.

Figure 9:
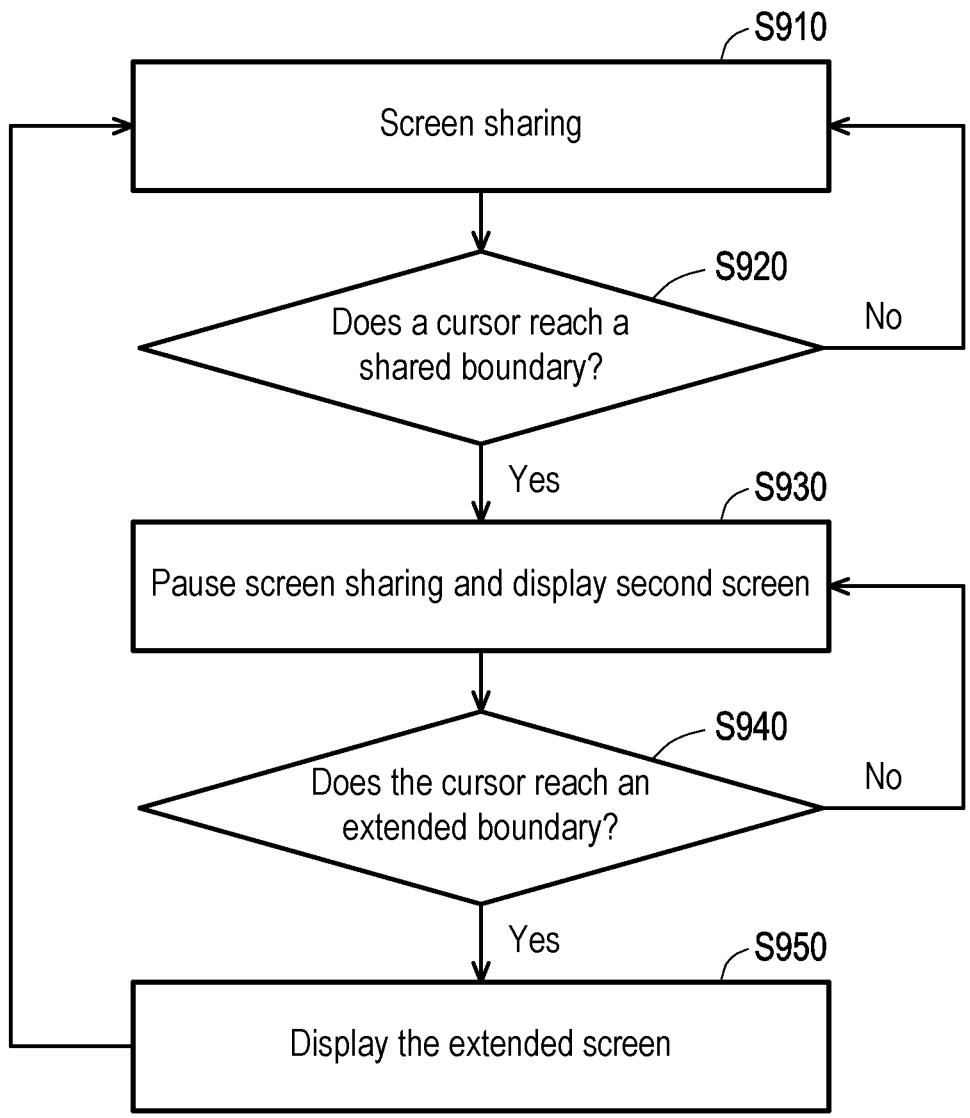
FIG. 9 is a flowchart illustrating screen switching of sharing screen and operation mode according to an embodiment of the disclosure.

FIG. 9 is a flowchart illustrating screen switching of sharing screen and operation mode according to an embodiment of the disclosure. Referring to FIG. 9, the first host device 11 transmits the third screen SCE to the second host device 21, so that the second host device 21 shares the screen (for example, the second display 22) with the first host device 11 (step S910).

The first software 111 may determine whether a position (corresponding to the second interactive position of the HMI device 13) of the cursor on the screen displayed on the second display 22 reaches/exceeds the shared boundary (step S920). If the position of the cursor has reached/exceeded the shared boundary, the second host device 21 may block/prohibit display of the third screen SCE from the first host device 11 (i.e., pause sharing screen), and display the original second screen SC2 on the second display 22 (step S930). In addition, the HMI device 13 coupled to the first host device 11 may operate the second screen SC2 displayed on the second display 22. On the other hand, if the position of the cursor does not reach/exceed the shared boundary, the second host device 21 may continue to display the third screen SCE (i.e., continue to share the screen), i.e., display the third screen SCE on the second display 22 (return to step S910). In addition, the HMI device 13 coupled to the first host device 11 may operate the third screen SCE displayed on the second display 22.

The first software 111 or the second software 211 may determine whether the position (corresponding to the second interactive position of the HMI device 13) of the cursor on the screen displayed on the second display 22 reaches/exceeds the extended boundary (step S940). If the position of the cursor has reached/exceeded the extended boundary, the second host device 21 may block/prohibit the display of the second screen SC2 from the second host device 21, and display the third screen SCE from the first host device 11 on the second display 22 (step S950). In addition, the HMI device 13 coupled to the first host device 11 may operate the third screen SCE displayed on the second display 22. On the other hand, if the position of the cursor does not reach/exceed the extended boundary, the second host device 21 may continue to display the second screen SC2, i.e., display the second screen SC2 on the second display 22 (return to step S930). Moreover, the HMI device 13 coupled to the first host device 11 may operate the second screen SC2 displayed on the second display 22.

Figure 10A:
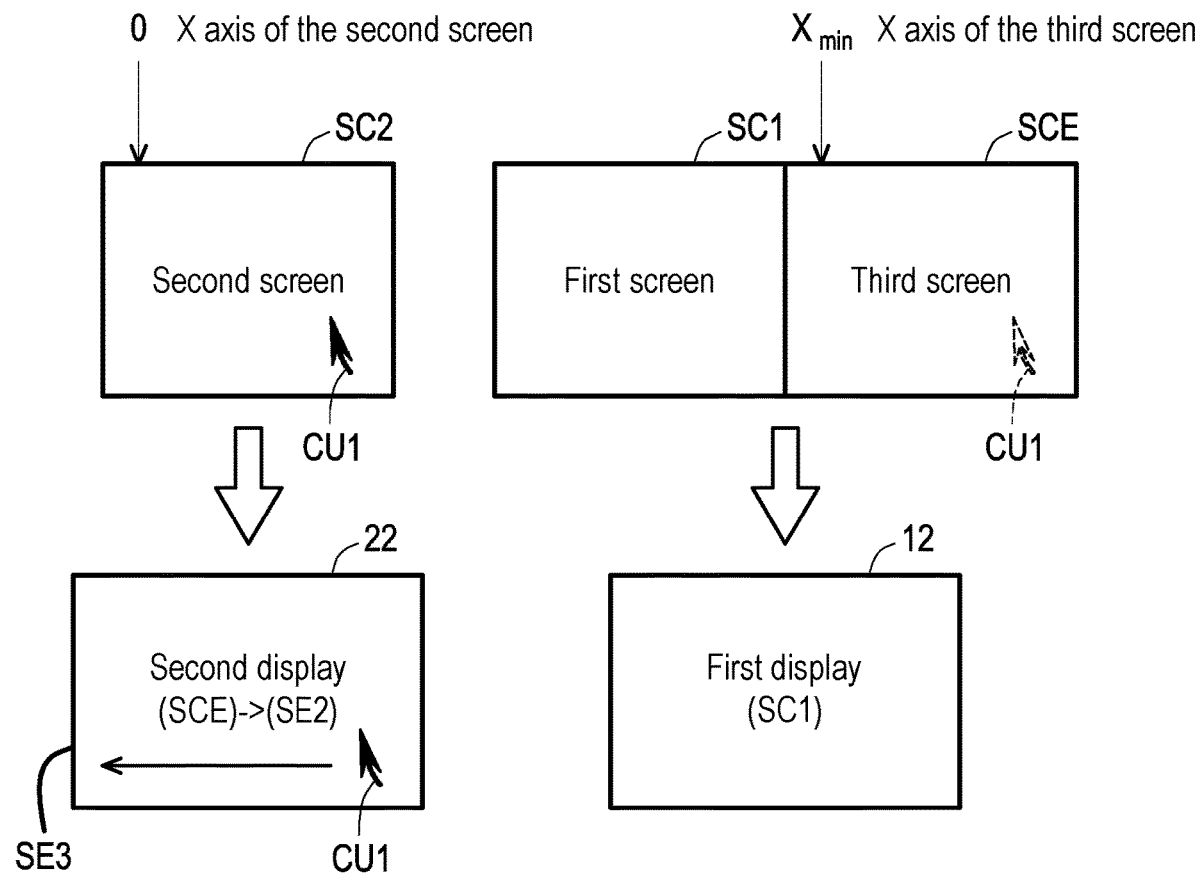
FIG. 10A is a schematic diagram of screen restore of sharing screen and operation mode according to an embodiment of the disclosure.

FIG. 10A is a schematic diagram of screen restore of sharing screen and operation mode according to an embodiment of the disclosure. Referring to FIG. 10A, in an application scenario 3-2, initially, the second display 22 displays the third screen SCE. After the cursor CU1 moves to the left and reaches/exceeds the second switching boundary SE3 (i.e., the shared boundary, a horizontal axis coordinate of the third screen SCE is $X_{min}$), the second software 211 may temporarily close the display of the third screen SCE on the second display 22 (the cursor CU1 is not on the third screen SCE, and is marked by a dotted line in the figure), and display the original second screen SC2 on the second display 22. On the other hand, as described in the application scenario 2-1 (for example, corresponding to FIG. 6A), the HMI device 13 coupled to the first host device 11 may operate the functions on the second screen SC2 displayed on the second display 22, for example, to select, open or move a virtual icon or a user interface on the second screen SC2.

Figure 10B:
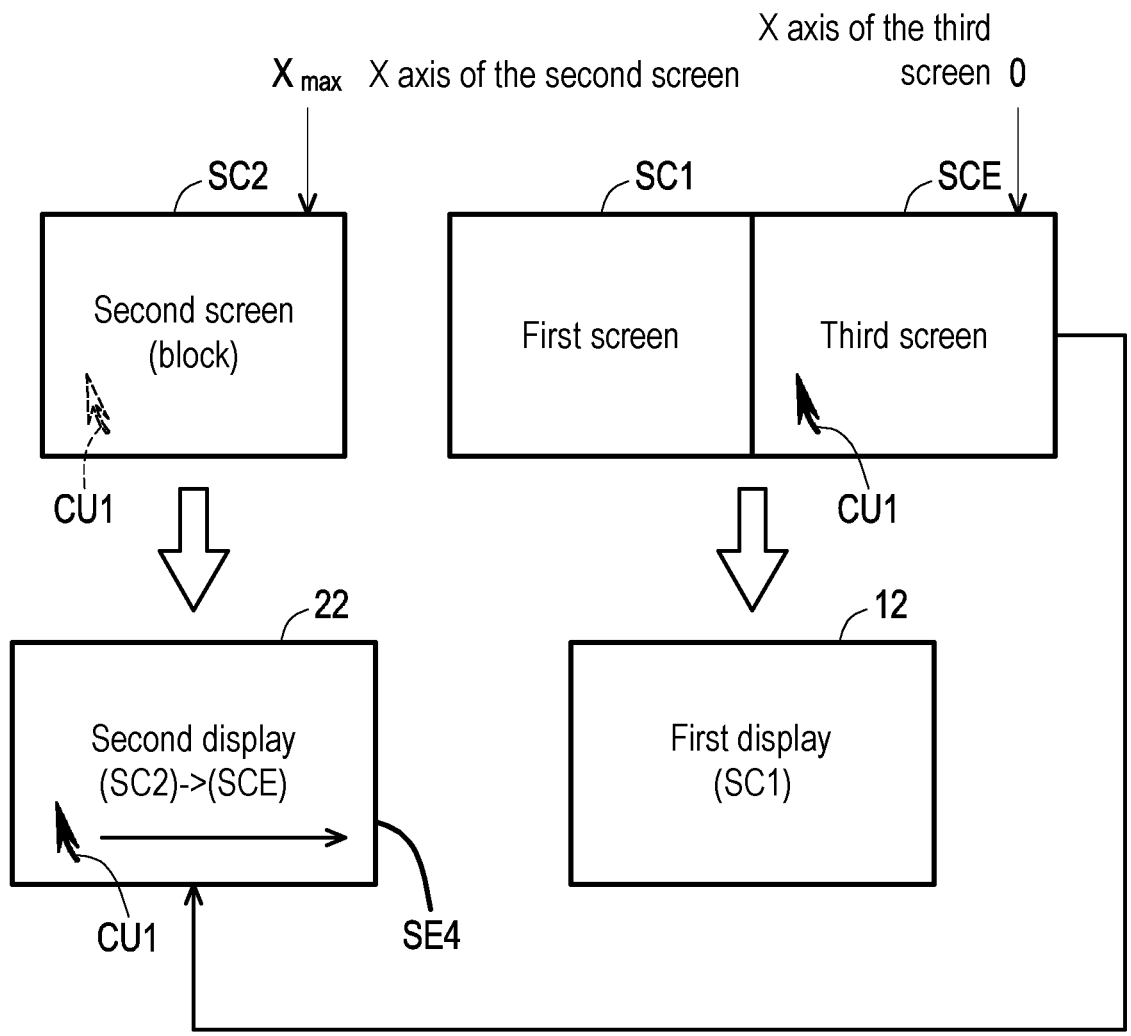
FIG. 10B is a schematic diagram of extended display of sharing screen and operation mode according to an embodiment of the disclosure.

FIG. 10B is a schematic diagram of extended display of sharing screen and operation mode according to an embodiment of the disclosure. Referring to FIG. 10B, in an application scenario 3-3, initially, the second display 22 displays the second screen SC2. After the cursor CU1 moves to the right and reaches/exceeds a second switching boundary SE4 (i.e., the extended boundary, the horizontal axis coordinate of the second screen SC2 is $X_{max}$), the second software 211 may close the display of the second screen SC2 on the second display 22 (the cursor CU1 is not on the second screen SCE, and is marked by a dotted line in the figure). The bridge device 30 transmits another screen from the first host device 11 (for example, the third screen SCE) and the operating information of the HMI device 13. Moreover, the second software 211 displays the third screen SCE from the first host device 11 on the second display 22. At this time, the second display 22 serves as an extended screen of the first host device 11.

In summary, in the multi-host system and the operation sharing method of the embodiment of the disclosure, whether to share the screen and/or the operating information of the HMI device may be determined based on the interactive position of the HMI device on the screen. In this way, another host device may be used as an extended screen, and/or functions on the screen displayed by the other host device may be controlled through its own HMI device. The embodiments of the disclosure may improve the convenience and flexibility of human-machine interaction.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An operation sharing method, adapted to operations between a first host device and a second host device, wherein the first host device is coupled to a human-machine interface device and a first display, first software is loaded on the first host device, the second host device is coupled to a second display, second software is loaded on the second host device, the first host device is communicatively connected to the second host device, and the operation sharing method comprises:
   determining whether operating information of the human-machine interface device is conformed with a first switching condition through the first software;
   operating a screen displayed on the second display through the first host device or the second host device according to the operating information, when the operating information is conformed with the first switching condition;
   wherein the step of determining whether the operating information is conformed with the first switching condition comprises:
   comparing the operating information of the human-machine interface device with a first switching boundary on a first screen through the first software, and generating a first comparison result; and
   determining the screen displayed on the second display for operation according to the first comparison result.

2. The operation sharing method as claimed in claim 1, wherein the first comparison result is that the operating information of the human-machine interface device corresponds to a first interactive position on the first screen displayed on the first display, and it is determined through the first software that the operating information of the human-machine interface device is conformed with the first switching condition, when the first interactive position corresponding to the operating information exceeds the first switching boundary on the first screen.

3. The operation sharing method as claimed in claim 1, wherein the first switching boundary is a side boundary of the first screen.

4. The operation sharing method as claimed in claim 1, wherein the step of operating the screen displayed on the second display through the first host device according to the operating information of the human-machine interface device comprises:
- blocking a second screen from being displayed on the second display through the second host device, wherein the second screen originates from the second host device;
- receiving a third screen from the first host device through the second host device, wherein the third screen is an extended screen of the first screen;
- displaying the third screen through the second display; and
- operating the third screen displayed on the second display through the human-machine interface device coupled to the first host device.

5. The operation sharing method as claimed in claim 1, wherein the step of operating the screen displayed on the second display through the second host device according to the operating information of the human-machine interface device comprises:
- transmitting the operating information of the human-machine interface device to the second host device through the first host device;
- displaying a second screen on the second display through the second host device, wherein the second screen originates from the second host device; and
- operating the second screen displayed on the second display through the human-machine interface device coupled to the first host device.

6. The operation sharing method as claimed in claim 1, wherein the step of operating the screen displayed on the second display through the first host device or the second host device according to the operating information of the human-machine interface device comprises:
- receiving a third screen from the first host device through the second host device, wherein the third screen is an extended screen of the first screen;
- displaying a second screen and the third screen through the second display, wherein the second screen originates from the second host device; and
- operating the second screen and the third screen displayed on the second display through the human-machine interface device coupled to the first host device.

7. The operation sharing method as claimed in claim 1, wherein when the operating information is conformed with the first switching condition, and after the first host device or the second host device operates the screen displayed on the second display according to the first comparison result, the method further comprises:
- determining whether the operating information of the human-machine interface device is conformed with a second switching condition through the first software or the second software; and
- operating the screen displayed on the second display through the first host device or the second host device according to the operating information of the human-machine interface device, when the operating information is conformed with the second switching condition, wherein the step of determining whether the operating information is conformed with the second switching condition comprises:
  - comparing the operating information of the human-machine interface device with a second switching boundary on the screen displayed by the second display, and generating a second comparison result; and
  - operating the screen displayed on the second display through the first host device or the second host device according to the second comparison result.

8. The operation sharing method as claimed in claim 7, wherein the step of operating the screen displayed on the second display according to the operating information of the human-machine interface device through the second host device comprises:
- blocking a display of a third screen from the first host device through the second host device, wherein the third screen is an extended screen of the first screen;
- displaying a second screen through the second display, wherein the second screen originates from the second host device; and
- operating the second screen displayed on the second display through the human-machine interface device coupled to the first host device.

9. The operation sharing method as claimed in claim 7, wherein the step of operating the screen displayed on the second display according to the operating information of the human-machine interface device through the first host device comprises:
- blocking a display of a second screen through the second host device, wherein the second screen originates from the second host device; and
- displaying a third screen from the first host device through the second display, wherein the third screen is an extended screen of the first screen; and
- operating the third screen displayed on the second display through the human-machine interface device coupled to the first host device.

10. The operation sharing method as claimed in claim 7, wherein the second comparison result is that the operating information of the human-machine interface device corresponds to a second interactive position on the screen displayed on the second display, and it is determined through the first software or the second software that the operating information of the human-machine interface device is conformed with the second switching condition, when the second interactive position corresponding to the operating information exceeds the second switching boundary on the screen displayed on the second display, wherein the second switching boundary is a shared boundary or an extended boundary, and the step of determining whether the operating information of the human-machine interface device is conformed with the second switching condition comprises:
- defining the second switching boundary on a third screen as the shared boundary for switching to a second screen when the screen displayed on the second display is the third screen from the first host device, wherein the third screen is an extended screen of the first screen, the second screen originates from the second host device, and the second switching condition is related to the second interactive position exceeding the shared boundary; and
- defining the second switching boundary on the second screen as the extended boundary for switching to the third screen of the first host device when the screen displayed on the second display is the second screen from the second host device, wherein the second switching condition is related to the second interactive position exceeding the extended boundary.

11. A multi-host system, comprising:
a first display, configured to display a first screen;
a human-machine interface device;
a first host device, coupled to the first display and the human-machine interface device;
a second display; and
a second host device, coupled to the second display;
wherein the first host device determines whether operating information of the human-machine interface device is conformed with a first switching condition, and
the first host device or the second host device operates a screen displayed on the second display according to the operating information, when the operating information is conformed with the first switching condition,
wherein the first host device compares the operating information of the human-machine interface device with a first switching boundary on the first screen, and generates a first comparison result, and
the first host device or the second host device operates the screen displayed on the second display according to the first comparison result.

12. The multi-host system as claimed in claim 11, wherein the first comparison result is that the operating information of the human-machine interface device corresponds to a first interactive position on the first screen displayed on the first display, and it is determined through the first host device that the operating information of the human-machine interface device is conformed with the first switching condition, when the first interactive position corresponding to the operating information exceeds the first switching boundary on the first screen.

13. The multi-host system as claimed in claim 11, wherein the first switching boundary is a side boundary of the first screen.

14. The multi-host system as claimed in claim 11, wherein
the second host device blocks a second screen from being displayed on the second display, wherein the second screen originates from the second host device;
the second host device receives a third screen from the first host device, wherein the third screen is an extended screen of the first screen;
the second host device displays the third screen through the second display; and
the human-machine interface device coupled to the first host device operates the third screen displayed on the second display.

15. The multi-host system as claimed in claim 11, wherein
the second host device receives the operating information of the human-machine interface device;
the second host device displays a second screen on the second display, wherein the second screen originates from the second host device; and
the human-machine interface device coupled to the first host device operates the second screen displayed on the second display.

16. The multi-host system as claimed in claim 15, wherein
the second host device receives a third screen from the first host device, wherein the third screen is an extended screen of the first screen;
the second host device displays the second screen and the third screen on the second display, wherein the second screen originates from the second host device; and
the human-machine interface device coupled to the first host device operates the second screen and the third screen displayed on the second display.

17. The multi-host system as claimed in claim 11, wherein
the first host device or the second host device determines whether the operating information of the human-machine interface device is conformed with a second switching condition; and
the first host device or the second host device operates the screen displayed on the second display according to the operating information of the human-machine interface device, when the operating information is conformed with the second switching condition,
wherein
the first host device or the second host device compares the operating information of the human-machine interface device with a second switching boundary on the screen displayed by the second display, and generates a second comparison result; and
the first host device or the second host device operates the screen displayed on the second display according to the operating information of the human-machine interface device.

18. The multi-host system as claimed in claim 17, wherein
the second host device blocks a third screen from the first host device, wherein the third screen is an extended screen of the first screen;
the second host device displays a second screen through the second display, wherein the second screen originates from the second host device; and
the human-machine interface device coupled to the first host device operates the second screen displayed on the second display.

19. The multi-host system as claimed in claim 17, wherein
the second host device blocks a display of a second screen, wherein the second screen originates from the second host device; and
the second host device displays a third screen from the first host device through the second display, wherein the third screen is an extended screen of the first screen; and
the human-machine interface device coupled to the first host device operates the third screen displayed on the second display.

20. The multi-host system as claimed in claim 17, wherein the second comparison result is that the operating information of the human-machine interface device corresponds to a second interactive position on the screen displayed on the second display, and the first host device or the second host device determines that the operating information of the human-machine interface device is conformed with the second switching condition, when the second interactive position corresponding to the operating information exceeds the second switching boundary on the screen displayed on the second display, wherein the second switching boundary is a shared boundary or an extended boundary, and
the first host device or the second host device defines the second switching boundary as the shared boundary for switching to a second screen when the screen displayed on the second display is a third screen from the first host device, wherein the third screen is an extended screen of the first screen, the second screen originates from the second host device, and the second switching condition is related to the second interactive position exceeding the shared boundary; and
the first host device or the second host device defines the second switching boundary as the extended boundary for switching to the third screen of the first host device when the screen displayed on the second display is the second screen from the second host device, wherein the second switching condition is related to the second interactive position exceeding the extended boundary.

21. The multi-host system as claimed in claim 11, further comprising:
a bridge device, communicatively connected between the first host device and the second host device, wherein the bridge device transmits the operating information of the human-machine interface device.

22. A multi-host system, comprising:
a first display, configured to display a first screen;
a human-machine interface device;
a first host device, coupled to the first display and the human-machine interface device;
a second display;
a second host device, coupled to the second display; and
a bridge device, communicatively connected between the first host device and the second host device, wherein
the bridge device transmits another screen from the first host device and operating information of the human-machine interface device, the second host device displays the another screen through the second display, and the second host device operates a screen displayed on the second display according to the operating information of the human-machine interface device.

23. The multi-host system as claimed in claim 22, wherein the another screen is an extended screen of the first screen, and the second host device further blocks a display of an original screen.

* * * * *